Aug. 24, 1937.  W. A. HEITNER  2,090,757

CLUTCH MECHANISM

Filed Jan. 30, 1935

Inventor
William A. Heitner

By Henry Fuchs Atty

Patented Aug. 24, 1937

2,090,757

UNITED STATES PATENT OFFICE 2,090,757

CLUTCH MECHANISM

William A. Heitner, Chicago, Ill., assignor to W. H. Miner, Inc., Chicago, Ill., a corporation of Delaware Application January 30, 1935, Serial No. 4,053

15 Claims. (Cl. 192—82)

This invention relates to improvements in clutch mechanisms, especially adapted for hand brakes.

One object of the invention is to provide a clutch mechanism of simple and efficient design, especially adapted for use in railway car hand brakes of the type which includes a winding element, a hand wheel for actuating the mechanism, gear means operatively connecting the hand wheel to the winding element for effecting rotation of the latter both in winding and unwinding direction, wherein the improved clutch mechanism upon rotation of the hand wheel in a direction to unwind said element serves to disconnect the winding element from the gear means, after a predetermined backing off of the brakes, thereby effecting quick and complete release of the brakes without further rotation of said hand wheel.

A more specific object of the invention is to provide in a hand wheel operated brake mechanism including a chain winding drum and power-multiplying actuating means therefor, comprising intermeshing worm and worm wheel members adapted to hold the brake mechanism against rotation in chain unwinding direction by the friction between said worm and worm wheel, clutch means for connecting the winding drum to the worm wheel, wherein the operation of the clutch is controlled through rotation of the hand wheel in such a manner that the clutch is disconnected to permit free rotation of the winding drum after a predetermined backing off of the brake mechanism.

Still another object of the invention is to provide in a brake mechanism of the character indicated in the preceding paragraph a clutch member for connecting the worm wheel to the chain winding drum, wherein the clutch member is rotatable with the worm wheel and is reciprocated by screw means, comprising a nut member, held against rotation, and a cooperating screw member rotatable with the clutch member, the parts being so proportioned and arranged that the screw member is entirely disconnected from the nut member when the clutch is completely engaged while the drum is rotated in direction to wind the chain thereon, and the nut is reengaged with the screw member and the latter threaded through the nut when the parts are rotated in a reverse direction, thereby effecting gradual disengagement of the clutch to permit backing off of the brakes before full release thereof by free rotation of the winding drum through complete disengagement of the clutch.

Other objects of the invention will more clearly appear from the description and claims hereinafter following.

Figure 1:
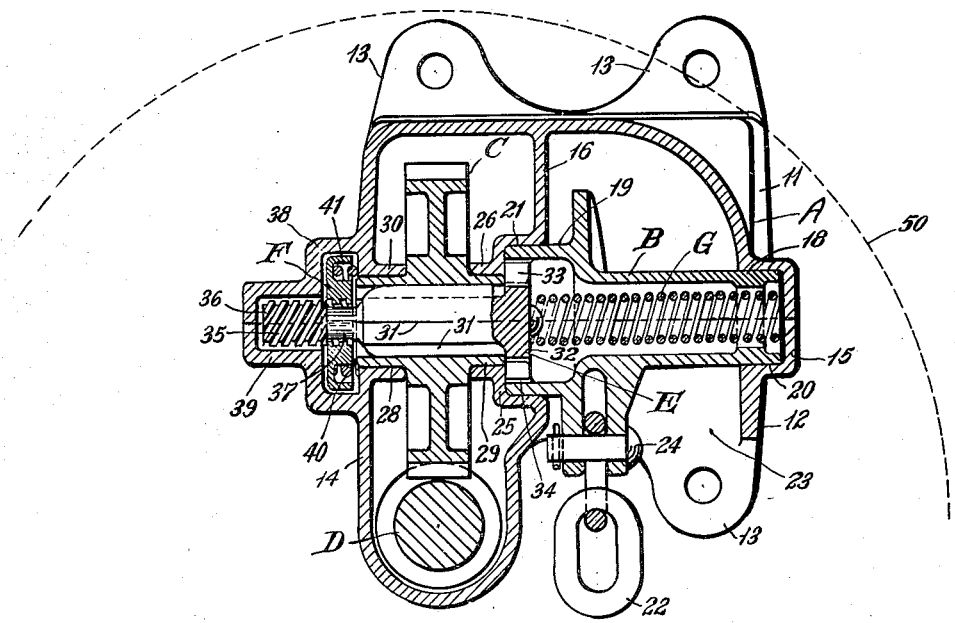
Figures 2, 3:
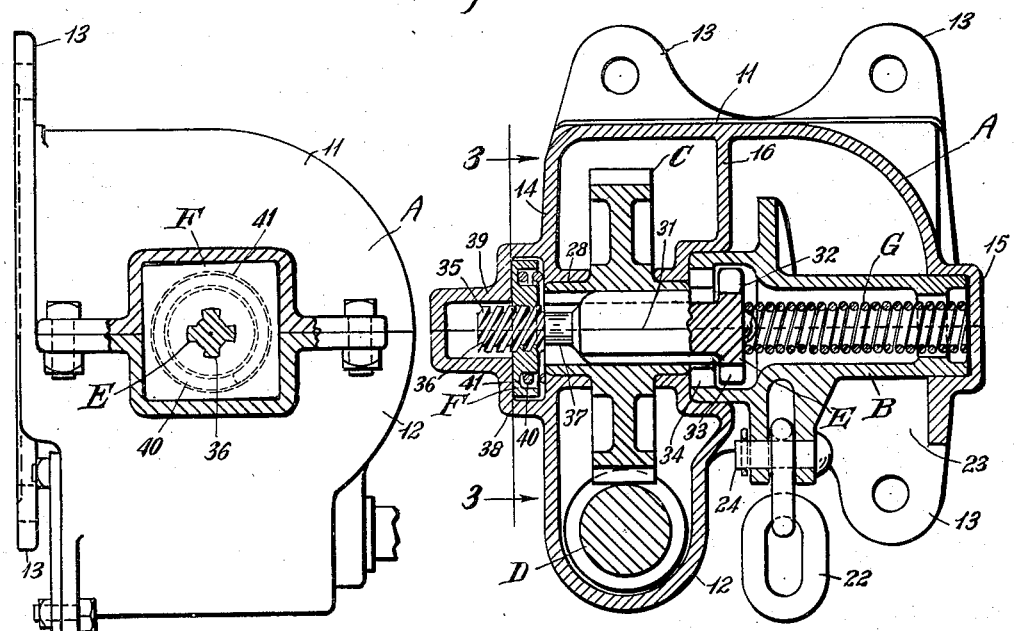

In the drawing forming a part of this specification, Figure 1 is a vertical sectional view through a hand brake mechanism applied to the end wall of a railway car, illustrating my improvements in connection therewith. Figure 2 is a view similar to Figure 1, but showing the parts in a different position. Figure 3 is a transverse, vertical sectional view, corresponding substantially to the line 3—3 of Figure 2.

In said drawing, the brake mechanism proper is illustrated as contained in a two-part housing A. The housing A is preferably mounted on the end wall of the car in the position shown in Figure 1 and comprises top and bottom sections 11 and 12 divided along a central horizontal plane. The sections 11 and 12 of the housing are provided with securing lugs or ears 13—13 by which the housing is fixed to the end wall of the car. The housing has end walls 14 and 15, and is divided into compartments by a vertical partition wall 16.

My improved clutch mechanism is illustrated in connection with a hand brake mechanism comprising a chain winding drum B; a worm wheel C; and a worm element D. The improved clutch mechanism comprises broadly a driving member, which is herein shown as the worm wheel C; a driven element, which is herein shown as the drum B; a sliding clutch member E; a spring pressed nut F cooperating with a screw section formed on the clutch member E; and a spring G cooperating with the clutch member.

The chain winding drum B is rotatably mounted in the right hand compartment of the housing A, as shown in Figures 1 and 2. The opposite ends of the drum are provided with cylindrical bearing portions 18 and 19, rotatably supported in bearing openings 20 and 21 provided respectively in the walls 15 and 16. The chain winding drum has the usual brake chain 22 connected thereto, the housing A being provided with a bottom opening 23 to accommodate the chain. The chain 22 has the end link thereof fixed to the drum by means of a pin 24 extending through spaced securing lugs projecting from the winding section of the drum. The drum is of hollow construction, as clearly shown in Figures 1 and 2, and has the bearing portion 19 of larger diameter than the bearing portion 18. At the left hand side, as viewed in Figures 1 and 2, the bearing opening 21 is provided with an annular reenforcing wall 25 which projects beyond the bearing portion 19 and is contracted to provide a bearing member 26 of reduced size for a purpose hereinafter pointed out.

The worm wheel C is mounted between the walls 14 and 16 of the housing and has cylindrical hub sections 28 and 29 projecting from opposite sides thereof, the hub section 29 being journaled in the bearing member 26 and the hub section 28 being journaled in a bearing member 30 projecting inwardly from the wall 14.

The sliding clutch member E is mounted within the worm wheel C. Said clutch member has longitudinally extending ribs 31 slidably engaged in cooperating grooves provided in the hollow hub of the worm wheel C, so that the clutch member rotates with the wheel C. At the right hand end, as viewed in Figures 1 and 2, the clutch member E is provided with a clutch head 32 having clutch projections 33 thereon engageable between clutch projections 34 on the drum B. At the other end, the clutch member E projects beyond the corresponding hub portion of the worm wheel C, said projecting portion being in the form of a cylindrical stem 35 of reduced diameter. The outer section of said stem 35 is threaded, as indicated at 36, and the section 37 of the stem immediately to the right of said threaded section, as viewed in Figure 1, is of slightly smaller diameter than said threaded section to clear the threads of the nut F, as hereinafter pointed out. As shown in Figures 1 and 2, the wall 14 of the housing is provided with an outstanding hollow boss having a portion 38 of substantially square cross-section and a portion 39 of substantially cylindrical cross-section. The cylindrical portion of the boss is of smaller size than the portion 38 and serves to accommodate the stem 35 of the clutch member E. The square section 38 of the boss provides a substantially rectangular seat or socket for the nut F.

The nut F is of square cross-section, as clearly shown in Figure 3, and fits the socket of the section 38 of the boss whereby the nut is held against rotation. As shown in the drawing, the nut is provided with interior threads which cooperate with the threads of the section 36 of the stem 35. The cooperating threads, as shown, are left hand so that the stem will be screwed into the nut when the clutch member E is rotated in a left hand direction. The nut has end play in the socket of the boss, as clearly shown in Figures 1 and 2, and is spring pressed outwardly by a coil spring 40 seated in an annular groove 41 in the nut and bearing on the wall 14 of the housing A.

The clutch member E is pressed to the left, as viewed in Figures 1 and 2, by means of the spring G housed within the hollow portion of the drum B.

The worm wheel C is actuated by the worm element D disposed below the worm wheel and having its opposite ends journaled in the front and rear walls of the housing A. The worm element D is actuated by the usual hand wheel, which is indicated by the dotted lines 50 in Figure 1.

The operation of my improved clutch mechanism in connection with the hand brake mechanism herein illustrated is as follows: To tighten the chain, the worm wheel C is rotated in a clockwise direction, looking from left to right in Figure 1, the same being actuated through operation of the worm D by means of the rotary hand wheel 50. The clutch member E is rotated with the worm wheel, and through engagement with the drum B actuates the latter to wind the chain thereon. During the winding operation, the inner ends of the threads of the screw section 36 of the clutch member E will ratchet over the threads of the nut. The clutch member will thus remain in the engaged position shown in Figure 1 during the entire winding operation. As will be evident, the yielding action of the nut permits of this ratcheting action without damage to the threads of the clutch member E and nut F. In effecting release of the brakes, the worm D is rotated in a reverse direction to that hereinbefore described, thereby rotating the worm wheel C and the clutch member E in contra-clockwise direction and effecting unwinding of the chain from the drum. Inasmuch as the nut F is spring pressed outwardly toward the inner ends of the threads of the screw section 36 of the clutch member E, the threads of the clutch member are engaged with the threads of the nut and screwed into said nut, thereby sliding the clutch member to the right, as viewed in Figure 1. After a predetermined backing off of the brakes, the clutch member will have been moved to the completely disengaged position shown in Figure 2, permitting free rotation of the chain winding drum to effect quick and complete release of the brakes without further rotation of the hand wheel. When the hand wheel is again rotated in chain winding direction, rotation of the clutch member E will effect unscrewing of the section 36 thereof from the nut F, thereby sliding the clutch member to the left, as viewed in Figure 2, until it reaches the engaged position shown in Figure 1. Winding of the chain on the drum then proceeds, in the manner hereinbefore described, until the brakes have been applied to the desired extent.

As will be evident from the preceding description taken in connection with the drawing, my improved construction provides reliable means for effecting winding of the chain on the drum to tighten the brakes, backing off of the brakes to a predetermined extent prior to release, and complete release of the brakes by operation of the hand wheel only, thereby entirely eliminating necessity for separately operated release mechanism such as now commonly employed in quick releasing hand brakes, and greatly facilitating the handling of railway cars.

I have herein shown and described what I now consider the preferred manner of carrying out my invention, but the same is merely illustrative and I contemplate all changes and modifications that come within the scope of the claims appended hereto.

I claim:

1. In a mechanism of the character described, the combination with a rotary driving member; of a rotary driven member; a clutch member rotatable with the driving member in reverse directions, said clutch member being axially slidable with respect to the driving member; a clutch head on one end of the clutch member having teeth engageable with clutch means on the driven member; a nut held against rotation; and a screw section projecting from the other end of said clutch member, said screw section being engageable with the nut and being of greater extent lengthwise of the clutch member than said clutch teeth, said clutch member having a plain cylindrical section adjacent said screw section, said cylindrical section of a length at least as great as the thickness of said nut, said cylindrical section being of smaller diameter than said screw section to entirely clear the threads of the nut, said cylindrical section being so positioned on said clutch member that the cylindrical section thereof is disposed within the nut when the teeth of the clutch head are engaged with the clutch means of the driven member.

2. In a mechanism of the character described, the combination with a rotary driving member; of a rotary driven member; a clutch member rotatable with the driving member in reverse directions, said clutch member being axially slidable with respect to the driving member; a clutch head on one end of the clutch member having teeth engageable with clutch means on the driven member; a nut held against rotation; a screw section projecting from the other end of said clutch member, said screw section being engageable with the nut and being of greater extent lengthwise of the clutch member than said clutch teeth, said clutch member having a plain cylindrical section adjacent said screw section, said cylindrical section of a length at least as great as the thickness of said nut, said cylindrical section being of smaller diameter than said screw section to entirely clear the threads of the nut, said cylindrical section being so positioned on said clutch member that the cylindrical section thereof is disposed within the nut when the teeth of the clutch head are engaged with the clutch means of the driven member; and yielding means for forcing said nut in a direction to engage the same with the threads of the screw section of the clutch member when said driving member and clutch member are rotated in one of said directions.

3. In a mechanism of the character described, the combination with a driving member; of a rotary driven member coaxial with the driving member, said driving member having a hollow hub; a releasable clutch member slidable in said hollow hub and rotatable in unison with said driving member in reverse directions; a clutch head at one end of said clutch member engageable with the driven member to effect rotation of the latter in unison with the driving member; a threaded section at the other end of said clutch member; a reduced section on said clutch member inwardly of said threaded section; a threaded nut spring pressed outwardly away from said worm wheel, said nut having a threaded opening adapted to loosely receive said reduced section of the clutch member and having the threads thereof fitting the threads of said clutch member; and means for holding said nut against rotation.

4. In a mechanism of the character described, the combination with a rotary driving member; of a rotary driven member coaxial with said driving member, said driving member having a hollow hub; a releasable clutch member slidable in said hollow hub and rotatable in unison with said driving member in reverse directions; a clutch head at one end of said clutch member engageable with the driven member to effect rotation of the latter in unison with the driving member; a threaded section at the other end of said clutch member; a reduced section on said clutch member inwardly of said threaded section; a non-circular threaded nut, said nut having a threaded opening of a size to loosely accommodate said reduced section of the clutch member and having the threads thereof fitted to the threads of said clutch member; a non-circular pocket in which said nut is seated and held against rotation, said nut having lateral play in said pocket in a direction lengthwise of said clutch member; and spring means for pressing said nut outwardly away from said worm wheel.

5. In a clutch mechanism, the combination with a rotary driving member; of a clutch element rotatable with said member, said clutch element being coaxial with said rotary member and slidable lengthwise of the same; a driven rotary member coaxial with said driving member and clutch element, said element and driven member having interengaging clutch means thereon; a screw fixed to said clutch element; a nut held against rotation, said nut having limited endwise movement and being engageable with said screw; and spring means for yieldingly forcing said nut into engagement with said screw.

6. In a mechanism of the character described, the combination with a rotary operating member; of a rotary driving member coaxial with said operating member; means for rotating said driving member in reverse directions; a releasable clutch member slidable coaxially of said driving member and operating member and normally operatively connecting the same for rotation in unison, said clutch member being rotatable with said driving member in said reverse directions; a nut coaxial with said clutch member; means for holding said nut against rotation with respect to the driving member and clutch member and constantly retaining the same in coaxial relation with said clutch member; and screw means on said clutch member automatically engageable with said nut for shifting said clutch member axially to release the same when said driving member and clutch member are rotated in one of said directions.

7. In a mechanism of the character described, the combination with a rotary operating member; of a rotary driving member coaxial with said operating member; worm gear means for rotating said driving member in reverse directions; a releasable slidable clutch member connected to the driving member for rotation in unison therewith and having sliding movement with respect thereto, said clutch member normally operatively connecting the driving member and operating member for rotation in unison in reverse directions; and means thrown into operation and actuated by rotation of said clutch member in unison with the driving member in one of said directions for shifting said clutch member axially with respect to the driving member and operating member to disconnect said clutch member from the operating member.

8. In a mechanism of the character described, the combination with a rotary operating member; of a driving member coaxial with said operating member; means for rotating said driving member in reverse directions; a releasable slidable clutch member connected to the driving member for rotation in unison therewith in said reverse directions, said clutch member normally operatively connecting the driving member and operating member for rotation in unison in said reverse directions; a screw threaded element; means for constantly holding said element against lateral displacement and rotation with respect to the clutch member and driving member; and cooperating screw means on said clutch member and element for shifting said clutch member to disengage the same from said operating member when the driving member is rotated in one of said directions.

9. In a mechanism of the character described, the combination with a rotary operating member; of a rotary driving member for rotating said operating member; means for rotating said driving member in either right or left hand direction; a releasable clutch member slidable with respect to said driving and operating members, said clutch member being operatively connected to the driving member for rotation therewith both in right and left hand directions, said clutch member normally operatively connecting the operating member to the driving member for rotation therewith in both right and left hand directions; and screw means for operating said clutch member, said screw means being operated by rotation of said driving member and clutch member in one of said directions to disengage the clutch member from the operating member, said screw means including coaxial nut and screw members in constant axial alignment, one of said last named members being fixed to the clutch member.

10. In a mechanism of the character described, the combination with an operating member; of a rotary driving member for rotating said operating member; worm gear means for rotating said driving member in both right and left hand directions; a releasable clutch member rotatable in unison with said driving member both in right and left hand directions, said clutch member being slidable with respect to said operating and driving members and normally operatively connecting the operating member to the driving member; and means actuated entirely through rotation of the driving member and clutch member in one of said directions for effecting delayed releasing action of the clutch to permit rotation of the operating member in said last named direction through rotation of said driving member in the same direction before complete disengagement of the clutch member from the operating member.

11. In a mechanism of the character described, the combination with a rotary operating member; of a driving member for rotating said operating member; a releasable clutch member rotatable in unison with said driving member both in right and left hand directions, said clutch member normally operatively connecting the operating member to the driving member; and means for shifting said clutch member in reverse directions including a screw member rotatable with the clutch member and a nut held against rotation and in constant axial alignment with said screw member.

12. In a mechanism of the character described, the combination with a rotary driving member; of a rotary driven member; a releasable clutch member rotatable in unison with said driving member both in right and left hand directions, said clutch member normally operatively connecting the driven member to the driving member; a screw rotatable with said clutch member; and a nut held against rotation and in constant axial alignment with said screw, said nut being disengaged from the threads of the screw when the driving member is rotated in one of said directions and being screwed into the nut to shift the clutch member to release the same when the driving member is rotated in a reverse direction.

13. In a mechanism of the character described, the combination with a rotary driving member; of a rotary driven member; a releasable clutch member rotatable in unison with said driving member both in right and left hand directions, said clutch member normally operatively connecting the driven member to the driving member; and means for shifting said clutch member in reverse directions comprising a nut held against rotation and in constant axial alignment with the clutch member and a screw section on said clutch member engaged with the threads of the nut.

14. In a mechanism of the character described, the combination with a rotary driving member; of a driven member; a releasable clutch member rotatable in unison with said driving member both in right and left hand directions, said clutch member normally operatively connecting the driven member to the driving member; and means for shifting said clutch member in reverse directions comprising a nut held against rotation and in constant axial alignment with said clutch member and a screw section on said clutch member engaged with the threads of the nut, said screw section being of such a length that the threads thereof remain engaged with the nut while the clutch member is shifted through relative rotation of the clutch member and nut and are disengaged therefrom when said clutch member is fully engaged with the driven member.

15. In a mechanism of the character described, the combination with a rotary driving member; of a rotary driven member; a releasable clutch member rotatable in unison with said driving member both in right and left hand directions, said clutch member normally operatively connecting the driven member to the driving member; means for shifting said clutch member in reverse directions to disengage the clutch member from the driven member and reengage the same therewith, said shifting means including a nut held against rotation and in constant axial alignment with said clutch member and a threaded section on said clutch member engaged with the threads of the nut, said threaded section being of such a length that the threads thereof remain engaged with the nut while the clutch member is being shifted through relative rotation of the clutch member and nut, and are disengaged from said nut after said clutch member has been engaged with the driven member; and means for yieldingly forcing said nut to engaged position with the threads of the clutch member.

WILLIAM A. HEITNER.